United States Patent
Sakaguchi et al.

(10) Patent No.: US 10,266,147 B2
(45) Date of Patent: Apr. 23, 2019

(54) PRETENSIONER, RETRACTOR, AND SEAT BELT DEVICE

(71) Applicant: JOYSON SAFETY SYSTEMS JAPAN K.K., Tokyo (JP)

(72) Inventors: Yoshiteru Sakaguchi, Shiga (JP); Masahiro Shiotani, Shiga (JP); Kunihiro Kamei, Shiga (JP)

(73) Assignee: JOYSON SAFETY SYSTEMS JAPAN K.K., Tokyo (JP)

( * ) Notice: Subject to any disclaimer, the term of this patent is extended or adjusted under 35 U.S.C. 154(b) by 140 days.

(21) Appl. No.: 15/455,911

(22) Filed: Mar. 10, 2017

(65) Prior Publication Data

US 2017/0259782 A1    Sep. 14, 2017

(30) Foreign Application Priority Data

Mar. 11, 2016   (JP) .................................. 2016-047737

(51) Int. Cl.
*B60R 22/46*   (2006.01)
(52) U.S. Cl.
CPC ................................ *B60R 22/4628* (2013.01)
(58) Field of Classification Search
CPC ........................... B60R 22/46; B60R 22/4628
See application file for complete search history.

(56) References Cited

U.S. PATENT DOCUMENTS

| 8,641,097 | B2 | 2/2014 | Hodatsu et al. |
| 2002/0000487 | A1* | 1/2002 | Hamaue .............. B60R 22/4628 242/374 |
| 2002/0053621 | A1* | 5/2002 | Shiotani ............. B60R 22/4628 242/374 |
| 2002/0060261 | A1 | 5/2002 | Kameyoshi et al. |

FOREIGN PATENT DOCUMENTS

| EP | 1 716 025 B1 | 7/2012 |
| EP | 2 489 558 B1 | 10/2014 |
| WO | WO-2005/080150 A1 | 9/2005 |

* cited by examiner

*Primary Examiner* — Sang K Kim
(74) *Attorney, Agent, or Firm* — Foley & Lardner LLP (57) ABSTRACT

Provided are a pretensioner, a retractor, and a seat belt device that can achieve weight reduction of a device by improving slidability of a power transmission member used for the pretensioner. A pretensioner includes a drive wheel for rotating the spool, and a power transmission unit for transmitting power to the drive wheel in an emergency. The power transmission unit includes a power transmission member for rotating the drive wheel, a pipe that contains the power transmission member, a gas generator for supplying a working gas into the pipe, and a housing that defines a passage for the power transmission member on an outer periphery of the drive wheel. The housing has a sliding member that is disposed at an outlet part of the pipe and that reduces frictional force between the housing and the power transmission member.

7 Claims, 5 Drawing Sheets

PRETENSIONER, RETRACTOR, AND SEAT BELT DEVICE

CROSS-REFERENCE TO RELATED APPLICATION

This application is based upon and claims benefit of priority from the Japanese Patent Application No. 2016-047737, filed on Mar. 11, 2016, the entire contents of which are incorporated herein by reference.

FIELD OF THE INVENTION

The present invention relates to a pretensioner, a retractor, and a seat belt device, and in particular, relates to a pretensioner, a retractor, and a seat belt device that are suitable for weight reduction of a device.

BACKGROUND OF THE PRESENT INVENTION

Vehicles such as automobiles generally are provided with seat belt devices for restraining an occupant in a seat that includes a seat portion on which the occupant sits and a backrest portion positioned back of the occupant. Such a seat belt device includes a webbing for restraining the occupant, a retractor for retracting the webbing, a guide anchor that is disposed on a vehicle body side and guides the webbing, a belt anchor for fixing the webbing to the vehicle body side, a buckle disposed on a side surface of the seat, and a tongue disposed in the webbing. The tongue is fitted into the buckle to restrain the occupant in the seat with the webbing. In such the seat belt device, a first end of the webbing is fixed to the belt anchor, and a second end of the webbing is inserted into the guide anchor to be connected to the retractor.

It is becoming common that such the retractor has a pretensioner that eliminates slack in the webbing in an emergency such as a vehicle collision (e.g., refer to Japanese Translation of PCT International Application Publication No. 2007-522030). A pretensioner described in JP-T No. 2007-522030 includes a pinion gear coupled to a spool for winding a webbing, a power transmission member (load transmission element) for rotating the pinion gear in a vehicle collision, and a tube (pipe) that contains the power transmission member. Additionally, the power transmission member described in JP-T No. 2007-522030 is a plurality of mass bodies (balls).

SUMMARY OF INVENTION

Recently, materials with a lower specific gravity (e.g., aluminum or the like) as compared to iron are being used in various components from the viewpoint of weight reduction of a vehicle. For example, when a material with a lower specific gravity is used for a power transmission member of a pretensioner, it is necessary to increase a speed of the power transmission member and to prevent speed reduction of the power transmission member to generate a driving force equivalent to iron or stainless steel which has been conventionally used.

The present invention is made in view of the above-described problems, and an object of the present invention is to provide a pretensioner, a retractor, and a seat belt device that can achieve weight reduction of a device by improving slidability of the power transmission member used for the pretensioner.

According to the present invention, there is provided a pretensioner including a drive wheel for rotating a spool that winds a webbing for restraining an occupant, and power transmission unit for transmitting power to the drive wheel in an emergency, wherein the power transmission unit includes a power transmission member for rotating the drive wheel, a pipe that contains the power transmission member, a gas generator for supplying a working gas into the pipe, and a housing that defines a passage for the power transmission member on an outer periphery of the drive wheel, and the housing has a sliding member that is disposed at an outlet part of the pipe and that reduces frictional force between the housing and the power transmission member.

Additionally, according to the present invention, there is provided a retractor including a spool for winding a webbing that restrains an occupant, and a pretensioner for winding the webbing and eliminating slack in an emergency, wherein the pretensioner includes a drive wheel for rotating the spool, and power transmission unit for transmitting power to the drive wheel in an emergency, the power transmission unit includes a power transmission member for rotating the drive wheel, a pipe that contains the power transmission member, a gas generator for supplying a working gas into the pipe, and a housing that defines a passage for the power transmission member on an outer periphery of the drive wheel, and the housing has a sliding member that is disposed at an outlet part of the pipe and that reduces frictional force between the housing and the power transmission member.

Furthermore, according to the present invention, there is provided a seat belt device including a webbing for restraining an occupant, a retractor for winding the webbing, a belt anchor for fixing the webbing on a vehicle body side, a buckle disposed on a side surface of the seat, and a tongue disposed in the webbing, wherein the retractor includes a spool for winding the webbing, and a pretensioner for winding the webbing and eliminating slack in an emergency, the pretensioner includes a drive wheel for rotating the spool, and power transmission unit for transmitting power to the drive wheel in an emergency, the power transmission unit includes a power transmission member for rotating the drive wheel, a pipe that contains the power transmission member, a gas generator for supplying a working gas into the pipe, and a housing that defines a passage for the power transmission member on an outer periphery of the drive wheel, and the housing has a sliding member that is disposed at an outlet part of the pipe and that reduces frictional force between the housing and the power transmission member.

In the above-described pretensioner, retractor, and seat belt device, a length of the sliding member may be longer than a pitch of the drive wheel that is to be meshed with the power transmission member.

Additionally, the power transmission member may be formed of a material with a lower specific gravity than iron. Further, the sliding member may be formed of a material with a higher specific gravity than the power transmission member. Furthermore, the housing may be formed of a material with a lower specific gravity than iron.

Advantageous Effects of Invention

According to the above-described pretensioner, retractor, and seat belt device of the present invention, there is disposed a sliding member on a housing corresponding to an outlet part of a pipe that ejects a power transmission member, which can improve slidability of the power transmission member that is in contact with the sliding member. Therefore, even when a material with a lower specific gravity than

BRIEF DESCRIPTION OF DRAWINGS

FIGS. 2(A) and 2(B) are explanatory views illustrating an operation state of the pretensioner illustrated in FIG. 1, in which FIG. 2(A) illustrates a normal state, and FIG. 2(B) illustrates an initial stage of ejecting the power transmission member.

FIGS. 3(A) and 3(B) are explanatory views illustrating an operation state of the pretensioner illustrated in FIG. 1, in which FIG. 3(A) illustrates an intermediate stage of ejecting the power transmission member, and FIG. 3(B) illustrates a completion state of ejecting the power transmission member.

FIGS. 4(A) and 4(B) are explanatory views illustrating a pretensioner according to other embodiments of the present invention, in which FIG. 4(A) illustrates a second embodiment, and FIG. 4(B) illustrates a third embodiment.

DETAILED DESCRIPTION OF THE PREFERRED EMBODIMENTS

Figure 1:
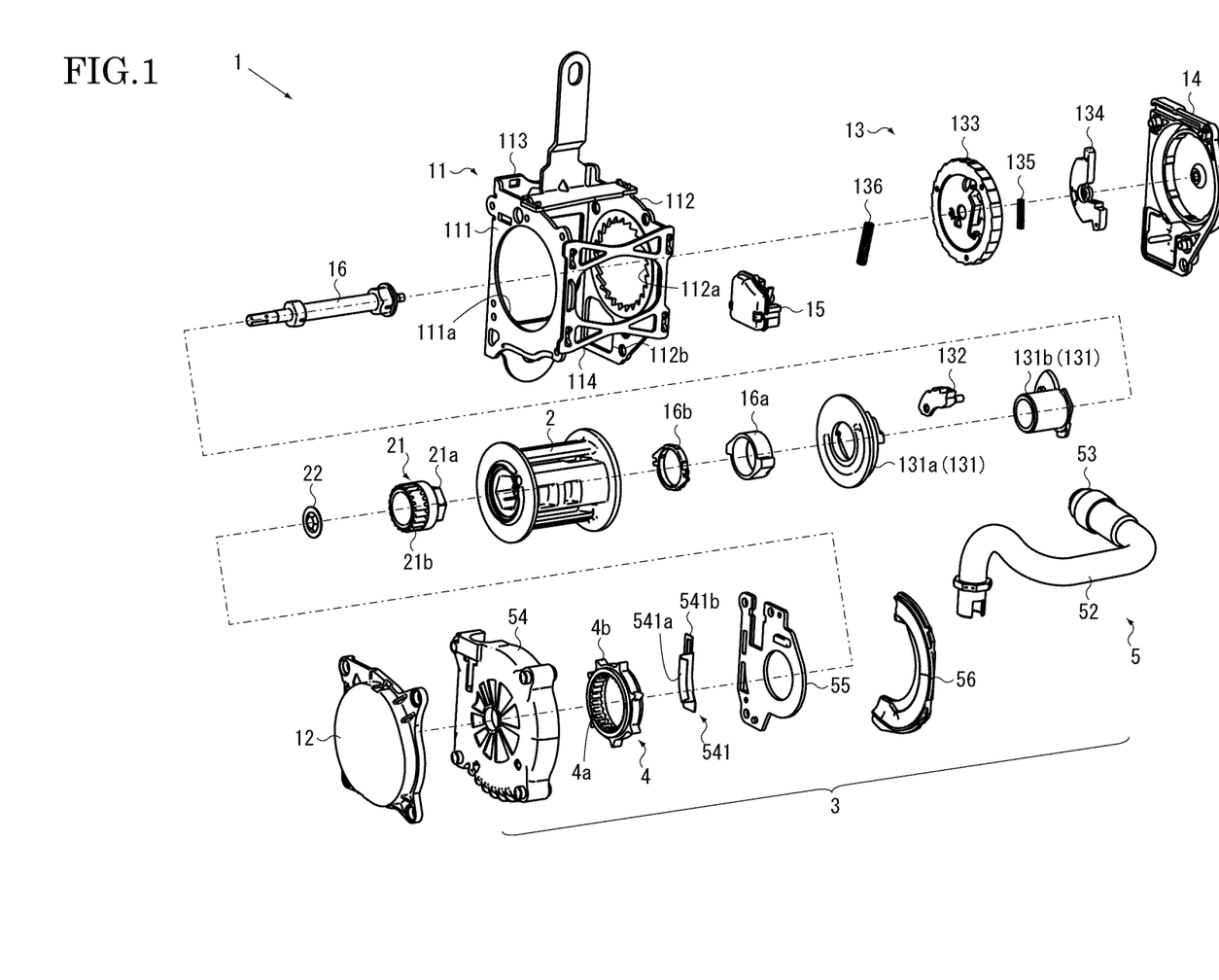
FIG. 1 illustrates a developed view of parts of a retractor according to a first embodiment of the present invention.
Figure 2A:
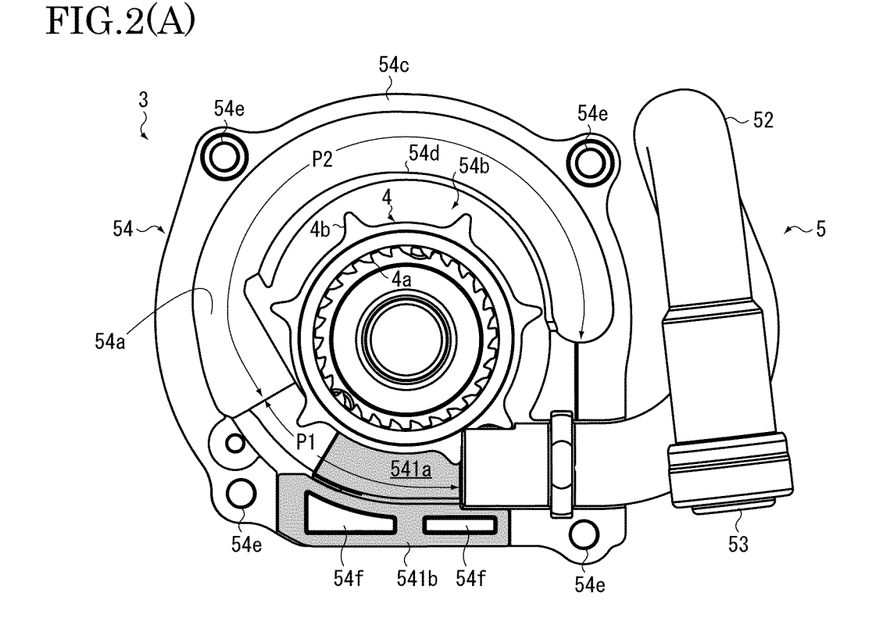
Figure 2B:
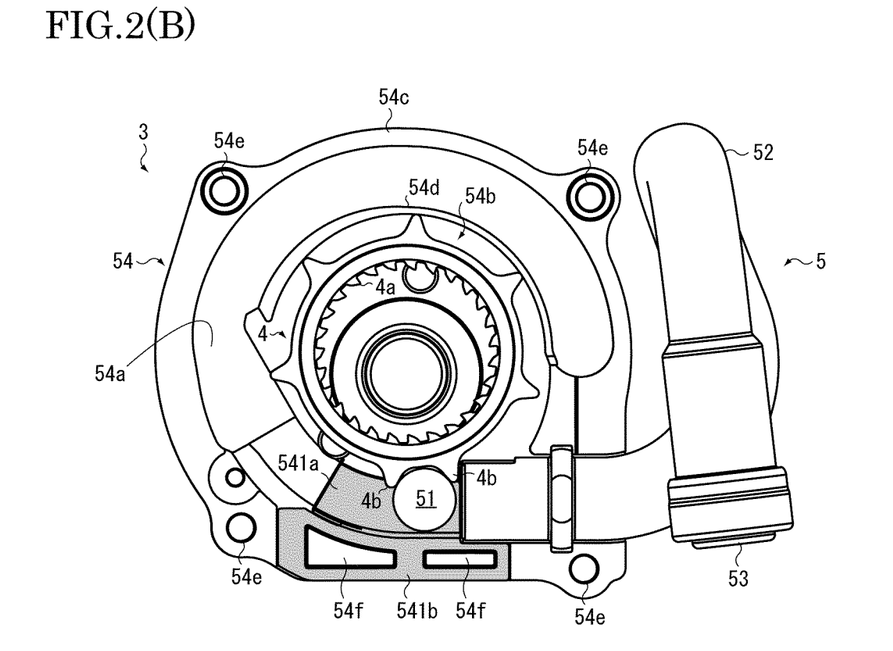
Figure 3A:
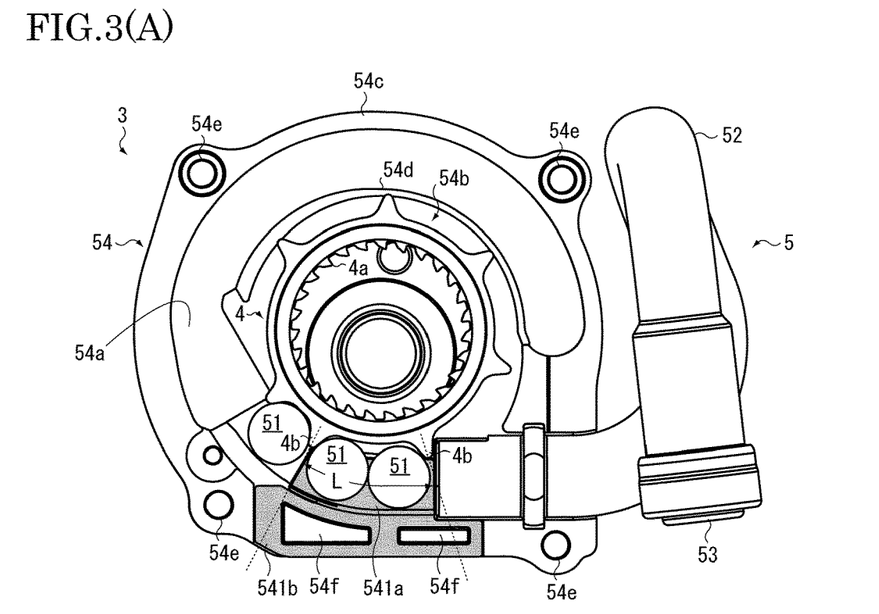
Figure 3B:
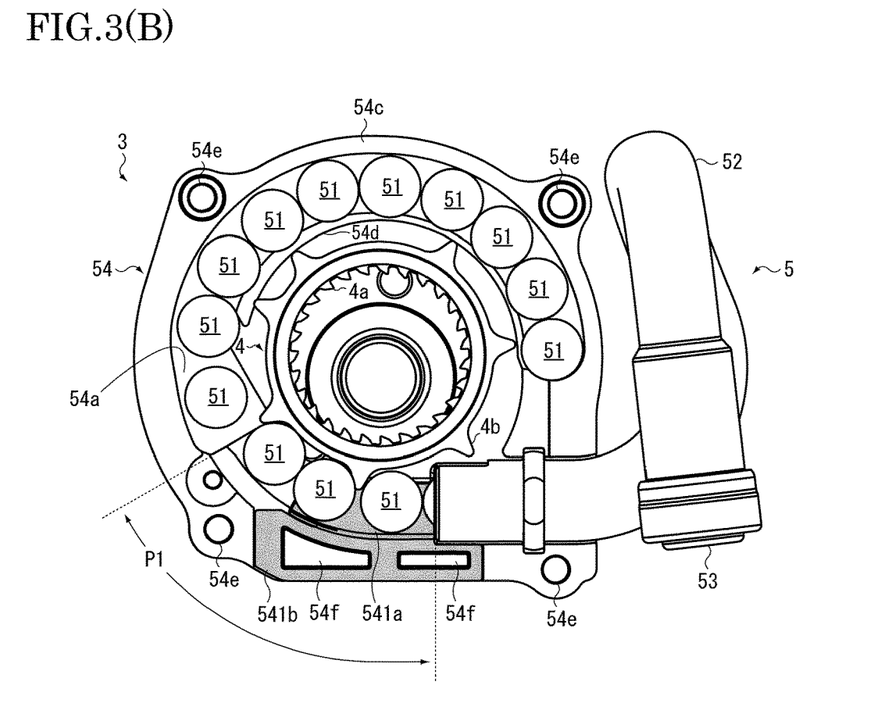

Embodiments of the present invention are described below with reference to FIGS. 1 to 5. Here, FIG. 1 illustrates a developed view of parts of a retractor according to a first embodiment of the present invention. FIGS. 2(A) and 2(B) are explanatory views illustrating an operation state of the pretensioner illustrated in FIG. 1, in which FIG. 2(A) illustrates a normal state, and FIG. 2(B) illustrates an initial stage of ejecting the power transmission member. FIGS. 3(A) and 3(B) are explanatory diagrams illustrating an operation state of the pretensioner illustrated in FIG. 1, in which FIG. 3(A) illustrates an intermediate stage of ejecting the power transmission member, and FIG. 3(B) illustrates a completion state of ejecting the power transmission member.

A retractor 1 according to the first embodiment of the present invention includes, for example, a spool 2 for winding a webbing that restrains an occupant, and a pretensioner 3 for winding the webbing and eliminating slack in an emergency, as illustrated in FIGS. 1 to 2(B). The pretensioner 3 includes a drive wheel 4 for rotating the spool 2, and power transmission unit 5 for transmitting power to the drive wheel 4 in an emergency. The power transmission unit 5 includes a power transmission member 51 for rotating the drive wheel 4, a pipe 52 that contains the power transmission member 51, a gas generator 53 for supplying a working gas into the pipe 52, and a housing 54 that defines a passage 54a for the power transmission member 51 on an outer periphery of the drive wheel 4. The housing 54 has a sliding member 541 that is disposed at an outlet part of the pipe 52 and that reduces frictional force between the housing 54 and the power transmission member 51.

The spool 2 is a retracting drum that retracts the webbing and is rotatably contained in a base frame 11 that forms a skeleton of the retractor 1. The base frame 11 includes, for example, a pair of opposed end surfaces 111 and 112, and a side surface 113 for connecting the end surfaces. The base frame 11 may include a tie plate 114 that is opposed to the side surface 113 and is connected to the end surfaces 111 and 112. Additionally, for example, a spring unit 12 is disposed on the end surface 111 side via the pretensioner 3, and a lock mechanism 13 is disposed on the end surface 112 side. It should be noted that disposition of the spring unit 12, the pretensioner 3, the lock mechanism 13 and the like is not limited to that illustrated.

Furthermore, the end surface 111 of the base frame 11 is formed with an opening 111a through which the spool 2 is inserted, and the end surface 112 of the base frame 11 is formed with an opening 112a that has internal teeth engageable with a pawl 132 of the lock mechanism 13. Furthermore, at an outside of the end surface 111 of the base frame 11, a part of the pretensioner 3 (e.g., the drive wheel 4, the housing 54 or the like) is disposed. Furthermore, the lock mechanism 13 is disposed at an outside of the end surface 112 of the base frame 11, and the lock mechanism 13 is contained in a retainer cover 14.

The retainer cover 14 may be disposed with a vehicle sensor 15 for detecting sudden deceleration of a vehicle body. The vehicle sensor 15 includes, for example, a spherical mass body and a sensor lever that is swung by a movement of the mass body. The vehicle sensor 15 may be fitted into an opening 112b formed on the end surface 112 of the base frame 11.

The spool 2 includes a cavity in a central portion, through which a torsion bar 16 forming an axis is inserted. Via a pinion gear 21, a first end of the torsion bar 16 (left side end in the figure) is connected to an end of the spool 2 (left side end in the figure), and is also connected to a spring core of the spring unit 12.

Therefore, the spool 2 is connected to the spring unit 12 via the torsion bar 16 and the pinion gear 21, and is energized in a direction in which the webbing is wound by a power spring housed in the spring unit 12. It should be noted that, a structure for applying a retracting force to the spool 2 is not limited to the illustrated structure.

Additionally, in an inside of the spool 2, there may be disposed a stopper 16a for specifying a maximum number of twisting rotation of the torsion bar 16, and a collar 16b for preventing backlash between the spool 2 and the stopper 16a.

The pinion gear 21, in its inside, for example, has a polygonal opening to be fitted with the torsion bar 16, and at its outside, has a polygonal shaft part 21a to be fitted with a polygonal opening of the spool 2. Additionally, the pinion gear 21 has external teeth 21b that are formed capable of meshing with the drive wheel 4. As explained below, the pinion gear 21 is rotatable without meshing with the drive wheel 4 at normal time, and is meshed and rotated with the drive wheel 4 in an emergency. It should be noted that the pinion gear 21 may be axially positioned by a push nut 22.

Additionally, a second end of the torsion bar 16 (right side end in the figure) is connected to a locking base 131 of the lock mechanism 13. As explained below, the locking base 131 is engageable with the base frame 11, and is capable of switching between a rotating state and a non-rotating state of the torsion bar 16. Therefore, even when subjected to a load in a direction of withdrawing the webbing in an operating state of the lock mechanism 13 (the state the locking base 131 is engaged with the base frame 11), a non-rotating state of the spool 2 can be maintained until a load equal to or more than a threshold value occurs in the torsion bar 16. Then, when the load equal to or more than the threshold value occurs in the torsion bar 16, the torsion bar 16 twists so that the spool 2 generates relative rotational movement to withdraw the webbing.

The lock mechanism 13 includes the locking base 131 connected to an end of the torsion bar 16, the pawl 132 swingably disposed to the locking base 131, a lock gear 133 rotatably disposed at an outside of the locking base 131, a flywheel 134 swingably disposed to the lock gear 133, and the retainer cover 14 that contains these parts and rotatably supporting the locking base 131. It should be noted that the lock mechanism 13 is not limited to that with the structure illustrated, but those with various structures which conventionally exist may be optionally selected and used. It should be noted that the flywheel 134 may be energized in a withdrawal direction of the webbing by a hook spring 135, and the pawl 132 may be energized in a retracting direction (inward in a radial direction) by a pawl spring 136.

The locking base 131 has, for example, substantially disk-shaped disk part 131a and a shaft part 131b that is fixed to the disk part 131a. In an inside of the shaft part 131b, there is provided a polygonal recess for holding the second end of the torsion bar 16. In the illustrated embodiment, the spool 2, the torsion bar 16, the locking base 131, and the like are coaxially disposed thereby to form a rotating shaft of the spool 2.

According to the lock mechanism 13 with the structure described above, when the webbing is withdrew faster than a normal speed of withdrawal, that is, acceleration speed of withdrawal of the webbing exceeds a specified threshold value, the flywheel 134 swings and engages with internal teeth (not illustrated) of the retainer cover 14, and a rotation of the lock gear 133 is regulated. Additionally, when the vehicle sensor 15 is actuated, the sensor lever thereof engages with external teeth of the lock gear 133, and the rotation of the lock gear 133 is regulated.

When the rotation of the lock gear 133 is regulated, the locking base 131 and the lock gear 133 are rotated relative to each other, and the pawl 132 swings along with this relative rotation to engage a tip of the pawl 132 with the internal teeth that are formed in the opening 112a of the base frame 11 (in other words, the locking base 131 is engaged with the base frame 11 via the pawl 132). As a result, the rotation of the locking base 131 is regulated and a rotation of the spool 2 is also regulated. Thus, the withdrawal of the webbing is locked.

It should be noted that, at normal time (when the acceleration speed of withdrawal of the webbing is equal to or less than a specified threshold value), the lock mechanism 13 is not actuated, and the locking base 131 and the lock gear 133 are rotated together along with the rotation of the spool 2. Thus, since the locking base 131 and the lock gear 133 are not rotated relative to each other at the normal time, the pawl 132 is maintained in a state of being retracted to a position where the pawl 132 does not interfere with the internal teeth that are formed in the opening 112a of the base frame 11.

The pretensioner 3 is a part for rotating the drive wheel 4 with the power transmission unit 5 and eliminating slack in the webbing in an emergency such as a vehicle collision. The power transmission unit 5 has, similarly to conventional power transmission unit 5, the power transmission member 51, the pipe 52, the gas generator 53, the housing 54 and the like. The housing 54 has, for example, a containing space 54b that contains the drive wheel 4 substantially in a center, as illustrated in FIG. 2(A).

Additionally, the housing 54 may have a cover plate 55 for regulating a movement of the drive wheel 4 in the housing 54, or the power transmission member 51 ejected in the housing 54, in an axial direction. Furthermore, a spacer 56 for positioning the drive wheel 4 in an axial direction may be disposed between the base frame 11 and the housing 54.

The drive wheel 4 is formed in substantially circular form. The drive wheel 4 has internal teeth 4a that are formed in an inner circumferential surface of the drive wheel 4 and are capable of meshing with the external teeth 21b of the pinion gear 21, and has a plurality of projections 4b that are formed at an outer circumferential surface of the drive wheel 4 and are to be engaged with the power transmission member 51. An inner diameter of the drive wheel 4 is set to be larger than an outer diameter of the pinion gear 21, and when the pinion gear 21 and the drive wheel 4 are coaxially disposed, the external teeth 21b of the pinion gear 21 and the internal teeth 4a of the drive wheel 4 are not meshed. It should be noted that a shape, a number, and disposition of the projections 4b are optionally designed according to a structure of the power transmission member 51, and are not limited to the illustrated structure.

The power transmission member 51 is structured, for example, with a plurality of spherical bodies made of metal, as illustrated in FIG. 3(B). The power transmission member 51 is, for example, formed of a material with a lower specific gravity than iron (e.g., aluminum, aluminum alloy, or the like). Adopting a material with a lower specific gravity than iron enables weight reduction of the power transmission member 51. It should be noted that the shape of the power transmission member 51 is not limited to spherical body. For example, it may have other shapes such as a cylindrical body, a prismatic body, oval rotational body.

The pipe 52 is a pressure vessel that forms an injection cylinder of the power transmission member 51. Since the pipe 52 requires a certain length, it is bent so as to be disposed along a side surface of the base frame 11. The gas generator 53 is mounted at a rear end portion of the pipe 52. Since the pipe 52 needs to enclose a high-temperature high-pressure gas, it is generally formed of an iron based material (stainless steel or the like) that is excellent in heat and pressure resistance.

The housing 54 is provided with, for example, as illustrated in FIG. 2(A), an outer wall 54c that has an inner surface through which the power transmission member 51 passes along an outer periphery of the drive wheel 4, and an inner wall 54d that guides the power transmission member 51 that has been rotated around the drive wheel 4, and defines the containing space 54b of the drive wheel 4. Additionally, on a joining surface with the cover plate 55 in the outer wall 54c, there may be formed a plurality of screw holes 54e or projections 54f for positioning the sliding member 541. It should be noted that each of the views in FIGS. 2(A) to 3(B) illustrates the power transmission unit 5 with the cover plate 55 removed.

The housing 54 is, for example, formed of a material with a lower specific gravity than iron (e.g., aluminum, aluminum alloy, or the like). In particular, the housing 54 may be manufactured by aluminum die cast. Adopting a material with a lower specific gravity than iron enables weight reduction of the housing 54.

The passage 54a of the power transmission member 51 is defined by the outer wall 54c and the inner wall 54d of the housing 54. The passage 54a has a substantially semicircular cross-section that is capable of guiding the spherical power transmission member 51. Additionally, the passage 54a has a power transmission section P1 for pressing the power transmission member 51 ejected from the pipe 52 against the drive wheel 4 to make the drive wheel 4 eccentric, so that the external teeth 21b of the pinion gear 21 and the internal teeth 4a of the drive wheel 4 are meshed. The passage 54a also has a collecting section P2 for collecting the power transmission member 51 separated from the drive wheel 4. The collecting section P2 may be widened than the power transmission section P1 at a switching point with the power transmission section P1.

Additionally, the housing 54 has the sliding member 541 that is disposed in the power transmission section P1 of the passage 54a corresponding to the outlet part of the pipe 52. The sliding member 541 is a part for reducing frictional force generated between the power transmission member 51 and the housing 54 in the power transmission section P1, and improving sliding. As illustrated in FIG. 1, the sliding member 541 has, for example, a curved portion 541a disposed in the passage 54a, and an attachment part 541b locked to the housing 54. It should be noted that, for convenience of description, the sliding member 541 is painted in gray for illustration in each of the views in FIGS. 2(A) to 3(B).

The curved portion 541a is disposed in the housing 54 so as to form a same surface as an inner surface of the passage 54a in the power transmission section P1. In particular, it is preferable to form a recess corresponding to a wall thickness of the curved portion 541a on the housing 54 side. Additionally, the attachment part 541b is in a shape of a flange part with an opening that can be inserted by the projections 54f that are formed in the housing 54, and is disposed on the joining surface between the housing 54 and the cover plate 55.

The sliding member 541 is, for example, formed of a metal plate that has a thinner wall thickness than a wall thickness of the pipe 52. Further, the sliding member 541 may be formed of a material with a higher specific gravity than the power transmission member 51. For example, when aluminum based metal is used as a material for the power transmission member 51, frictional force of the power transmission member 51 in the power transmission section P1 can be reduced by using a different kind of metal such as iron, stainless steel, or zinc as a material for the sliding member 541. Furthermore, the use of these metals can thin the wall thickness of the sliding member 541 while enduring an impact caused by a contact with the power transmission member 51, and can achieve weight reduction of the sliding member 541.

Additionally, in order to improve slidability of the sliding member 541, a coating layer may be formed or grease may be applied on a surface of the curved portion 541a. A coating agent or grease may be selected as required from any of those commercially available. It should be noted that, a shape or a mounting method of the sliding member 541 is not limited to the illustrated structure.

A length L (length in a direction along a center line of the passage 54a) of the curved portion 541a of the sliding member 541 is, for example, set to a length equal to a pitch of the projections 4b of the drive wheel 4 that are to be meshed with the power transmission member 51, as illustrated in FIG. 3(A). In this embodiment, the length L is set to the length of diameter×2 of the power transmission member 51. The section of the length L (section corresponding to a pitch of the drive wheel 4 from the outlet of the pipe 52) is where the largest load is applied between the power transmission member 51 and the housing 54. Therefore, by reducing frictional force in this section, slidability of the power transmission member 51 can be effectively improved. It should be noted that the length L of the sliding member 541 is not limited to the illustrated length. The length L may be set to be longer than the pitch of the drive wheel 4 that is to be meshed with the power transmission member 51.

Here, an action of the pretensioner 3 is described with reference to FIGS. 2(A) to 3(B). In a normal state illustrated in FIG. 2(A), the pretensioner 3 is not actuated, and the power transmission member 51 is contained in the pipe 52. Additionally, the drive wheel 4 is, for example, coaxially disposed with the pinion gear 21 by a shear pin, and the external teeth 21b of the pinion gear 21 and the internal teeth 4a of the drive wheel 4 are not meshed. It should be noted that, for convenience of description, a drawing of the pinion gear 21 is omitted in each of the views in FIGS. 2(A) to 3(B).

In an emergency such as a vehicle collision, the gas generator 53 is actuated to supply gas into the pipe 52. The power transmission member 51 is pushed by this gas to move within the pipe 52. As illustrated in FIG. 2(B), a first power transmission member 51 that is firstly ejected from the pipe 52 is structured so as to be independently engaged between the projections 4b of the drive wheel 4 in order to ensure a rotation of the drive wheel 4.

The power transmission member 51 ejected from the pipe 52 presses the drive wheel 4 upward in the figure by engaging with the drive wheel 4, and the power transmission member 51 slides with its reaction force while being pushed against the curved portion 541a of the sliding member 541. Additionally, the shear pin is broken by the power transmission member 51 and the drive wheel 4 is made eccentric upward in the figure, so that the internal teeth 4a of the drive wheel 4 are meshed with the external teeth 21b of the pinion gear 21.

The power transmission member 51 is successively ejected from the pipe 52 as illustrated in FIG. 3(A). Ejection of the power transmission member 51 causes the rotation of the drive wheel 4, and engagement of both of a second and a third power transmission member 51 between the projections 4b of the drive wheel 4. The rotation of the drive wheel 4 rotates the pinion gear 21, and accordingly, the spool 2 is rotated to wind the webbing.

Further, as the power transmission member 51 is successively ejected, the power transmission member 51 that has passed the power transmission section P1 of the passage 54a moves to the collecting section P2 of the passage 54a. When the repetition of this operation eventually fills the passage 54a with the power transmission member 51, as illustrated in FIG. 3 (B), the ejection of the power transmission member 51 is finished, the rotation of the drive wheel 4 is stopped, and the winding process of the webbing is completed.

According to the pretensioner 3 of the embodiment described above, there is disposed a sliding member 541 in a housing 54 corresponding to the outlet part of a pipe 52 that ejects a power transmission member 51, which can improve slidability of the power transmission member 51 that is in contact with the sliding member 541. Therefore, even when a material with a lower specific gravity than iron is used for the power transmission member 51, it is possible to prevent speed reduction of the power transmission member 51 ejected from the pipe 52, and to achieve weight reduction of a device while maintaining a function of the pretensioner 3.

Figure 4A:
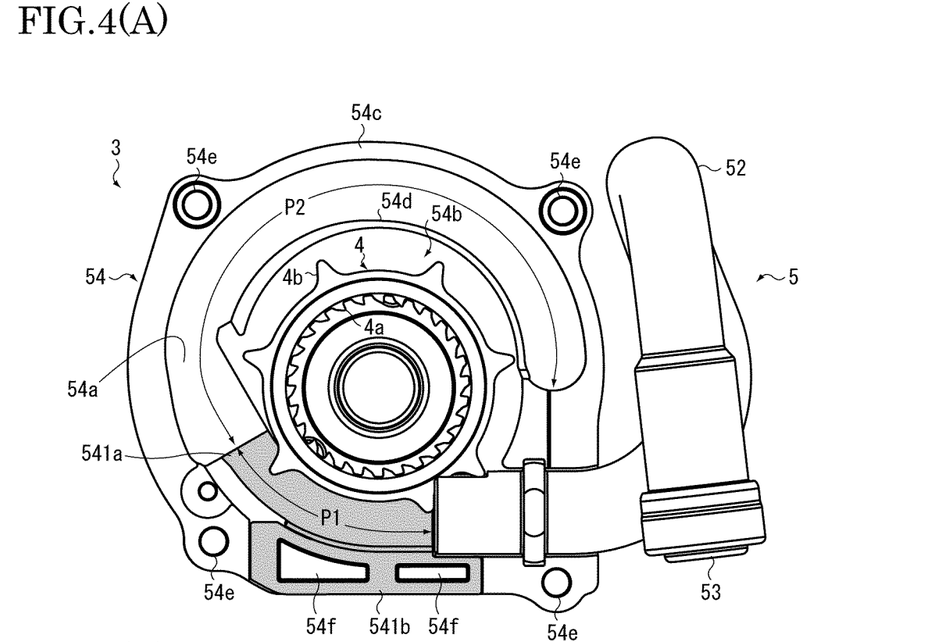
Figure 4B:
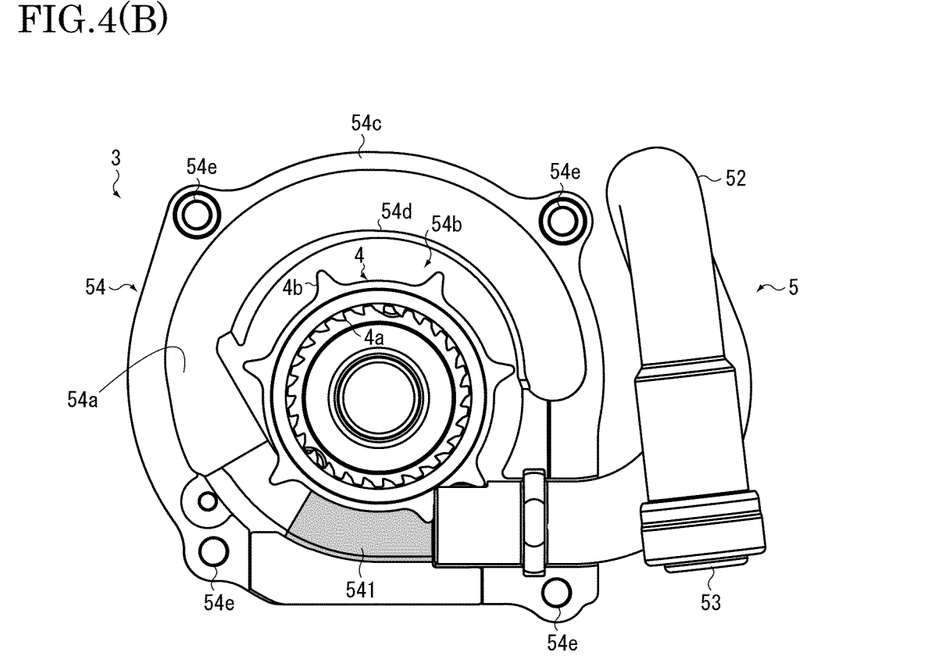

Next, a pretensioner 3 according to another embodiment of the present invention is described below with reference to FIGS. 4(A) and 4(B). Here, FIGS. 4(A) and 4(B) are explanatory views illustrating a pretensioner according to other embodiments of the present invention, in which FIG. 4(A) illustrates a second embodiment, and FIG. 4(B) illustrates a third embodiment. It should be noted that like reference numerals are given to like components to those of the above-described pretensioner 3 according to the first embodiment to omit a repeated description.

The pretensioner 3 according to the second embodiment illustrated in FIG. 4(A) is configured such that a length of a curved portion 541a of a sliding member 541 is set to be equal to a length of a power transmission section P1 of a passage 54a. According to the embodiment, slidability of a power transmission member 51 can be improved over a whole area of the power transmission section P1.

For example, after an operation of the pretensioner 3 is completed, a webbing may be withdrawn for impact absorption. In this case, the power transmission member 51 remaining in the power transmission section P1 (see FIG. 3(B)) is pushed back into the pipe 52. Even when such an event occurs, since the power transmission member 51 remaining in the power transmission section P1 is in contact with the curved portion 541a of the sliding member 541, slidability of the power transmission member 51 can be improved.

The pretensioner 3 according to the third embodiment illustrated in FIG. 4(B) is configured by changing a fixing method of the sliding member 541. In particular, the illustrated sliding member 541 is structured only by the curved portion 541a of the sliding member 541 of the first embodiment. Even when the sliding member 541 has such a form, the sliding member 541 can be disposed in a power transmission section P1 of a passage 54a.

In this case, a housing 54 is formed with a recess corresponding to a wall thickness of the sliding member 541. The sliding member 541 may be bonded to the recess to be fixed, or may be pressed into the recess to be fixed. Additionally, the sliding member 541 may be embedded when manufacturing the housing 54 (e.g., when casting). It should be noted that the sliding member 541 may be formed by welding or applying a predetermined metal powder to the recess formed in the passage 54a of the housing 54.

Figure 5:
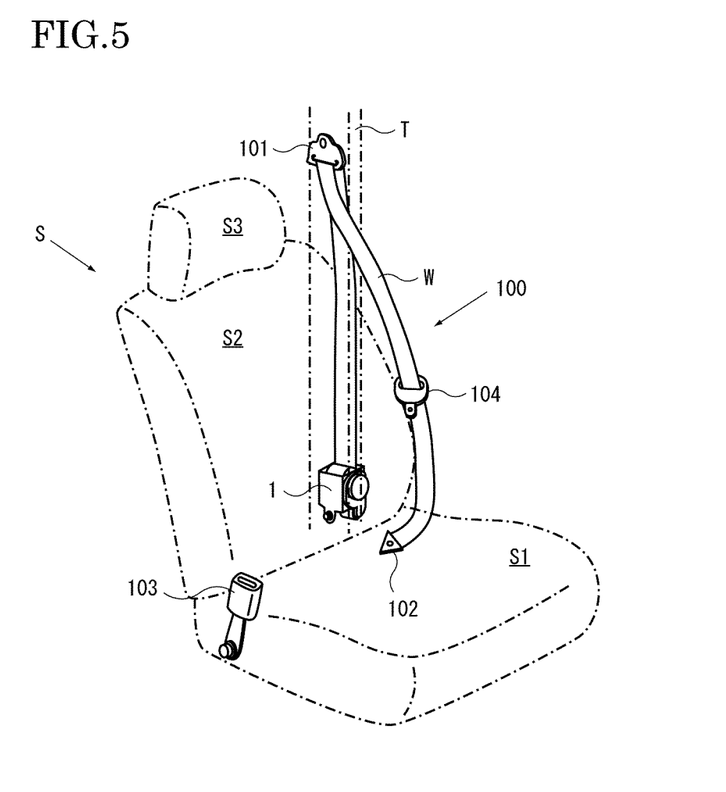
FIG. 5 illustrates an overall structure of a seat belt device according to an embodiment of the present invention.

Next, a seat belt device according to the embodiment of the present invention is described below with reference to FIG. 5. Here, FIG. 5 illustrates an overall structure of the seat belt device according to the embodiment of the present invention. It should be noted that, for convenience of description, parts other than the seat belt device are indicated by dotted-chain lines in FIG. 5.

A seat belt device 100 according to the embodiment illustrated in FIG. 5 includes a webbing W for restraining an occupant, a retractor 1 for retracting the webbing W, a guide anchor 101 that is disposed on a vehicle body side and guides the webbing W, a belt anchor 102 for fixing the webbing W to the vehicle body side, a buckle 103 that is disposed on a side surface of a seat S, and a tongue 104 that is disposed in the webbing W. The retractor 1 has, for example, the structure illustrated in FIG. 1.

Components other than the retractor 1 are briefly described below. The seat S includes, for example, a seat portion S1 on which the occupant sits, a backrest portion S2 that is positioned back of the occupant, and a headrest portion S3 for supporting the head of the occupant. The retractor 1 is disposed, for example, in a B-pillar T of the vehicle body. In general, the buckle 103 is often disposed on a side surface of the seat portion S1, and the belt anchor 102 is often disposed on a lower surface of the seat portion S1. Furthermore, the guide anchor 101 is often disposed at the B-pillar T. Then, a first end of the webbing W is connected to the belt anchor 102, and a second end of the webbing W is connected to the retractor 1 via the guide anchor 101.

Accordingly, in order to fit the tongue 104 into the buckle 103, the webbing W is withdrawn from the retractor 1 while being slid through an insertion hole of the guide anchor 101. Furthermore, when the occupant fastens the seat belt or releases the seat belt to leave the vehicle, the webbing W is retracted due to operation of the spring unit 12 of the retractor 1 until a certain amount of load is applied to the webbing W.

The above-described seat belt device 100 is made by applying the retractor 1 according to the embodiment described above to a typical seat belt device for a front seat. The retractor 1 includes a pretensioner 3 according to any one of the first to third embodiments described above. Therefore, according to the seat belt device 100 of the embodiment, even when a material with a lower specific gravity than iron is used for a power transmission member 51, it is possible to prevent speed reduction of the power transmission member 51 ejected from the pipe 52, and to achieve weight reduction of a device while maintaining a function of the pretensioner 3.

The present invention is not limited to the above-described embodiment. Of course, the present invention can be changed in various manners without departing from the gist of the present invention. For example, the present invention may be applied to a seat belt device used for a rear seat of a vehicle, and the present invention may be applied to a seat belt device used for a conveyance other than the vehicle.

What is claimed is:

1. A pretensioner comprising:
a drive wheel for rotating a spool that winds a webbing for restraining an occupant; and
a power transmission unit for transmitting power to the drive wheel in an emergency, wherein
the power transmission unit includes a power transmission member for rotating the drive wheel, a pipe that contains the power transmission member, a gas generator for supplying a working gas into the pipe, and a housing that defines a passage for the power transmission member on an outer periphery of the drive wheel, and a sliding member that reduces frictional force generated by the power transmission member ejected from the pipe,
wherein the sliding member includes a curved portion formed of a metal plate that has a thinner wall thickness than a thickness of the pipe and is disposed along an inner surface of the passage.

2. The pretensioner according to claim 1, wherein a length of the sliding member is longer than a pitch of the drive wheel that is to be meshed with the power transmission member.

3. The pretensioner according to claim 1, wherein the power transmission member is formed of a material with a lower specific gravity than iron.

4. The pretensioner according to claim 3, wherein the sliding member is formed of a material with a higher specific gravity than the power transmission member.

5. The pretensioner according to claim 4, wherein the housing is formed of a material with a lower specific gravity than iron.

6. A retractor comprising:
a spool for winding a webbing that restrains an occupant; and
a pretensioner for winding the webbing and eliminating slack in an emergency, wherein
the pretensioner includes a drive wheel for rotating the spool; and
a power transmission unit for transmitting power to the drive wheel in the emergency, wherein
the power transmission unit includes a power transmission member for rotating the drive wheel, a pipe that contains the power transmission member, a gas generator for supplying a working gas into the pipe, and a housing that defines a passage for the power transmission member on an outer periphery of the drive wheel, and a sliding member that reduces frictional force generated by the power transmission member ejected from the pipe, wherein the sliding member includes a curved portion formed of a metal plate that has a thinner wall thickness than a thickness of the pipe and is disposed along an inner surface of the passage.

7. A seat belt device comprising:

a webbing for restraining an occupant;

a retractor for winding the webbing;

a belt anchor for fixing the webbing on a vehicle body side;

a buckle disposed on a side surface of the seat; and a tongue disposed in the webbing, wherein the retractor includes a pretensioner comprising a drive wheel for rotating a spool that winds the webbing; and a power transmission unit for transmitting power to the drive wheel in an emergency, wherein the power transmission unit includes a power transmission member for rotating the drive wheel, a pipe that contains the power transmission member, a gas generator for supplying a working gas into the pipe, and a housing that defines a passage for the power transmission member on an outer periphery of the drive wheel, and a sliding member that reduces frictional force generated by the power transmission member ejected from the pipe, wherein the sliding member includes a curved portion formed of a metal plate that has a thinner wall thickness than a thickness of the pipe and is disposed along an inner surface of the passage.

* * * * *